(12) United States Patent
Ose et al.

(10) Patent No.: US 11,387,485 B2
(45) Date of Patent: Jul. 12, 2022

(54) ALL-SOLID-STATE LITHIUM ION SECONDARY BATTERY

(71) Applicant: TOYOTA JIDOSHA KABUSHIKI KAISHA, Toyota (JP)

(72) Inventors: Norihiro Ose, Shizuoka-ken (JP); Hajime Hasegawa, Susono (JP); Mitsutoshi Otaki, Susono (JP); Yusuke Kintsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 16/605,432

(22) PCT Filed: Apr. 13, 2018

(86) PCT No.: PCT/JP2018/015581
§ 371 (c)(1),
(2) Date: Oct. 15, 2019

(87) PCT Pub. No.: WO2018/193994
PCT Pub. Date: Oct. 25, 2018

(65) Prior Publication Data
US 2021/0126282 A1    Apr. 29, 2021

(30) Foreign Application Priority Data

Apr. 18, 2017 (JP) .............................. JP2017-082243

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/134* (2013.01); *H01M 4/386* (2013.01);
(Continued)

(58) Field of Classification Search
CPC ......... H01M 10/0562; H01M 10/0525; H01M 4/134; H01M 4/386; H01M 4/625
See application file for complete search history.

(56) References Cited

U.S. PATENT DOCUMENTS

| | | | |
|---|---|---|---|
| 2009/0142669 A1* | 6/2009 | Shinohara | H01M 4/13 429/320 |
| 2015/0270536 A1* | 9/2015 | Kawakami | H01M 4/583 429/319 |
| 2015/0349378 A1 | 12/2015 | Ose et al. | |

FOREIGN PATENT DOCUMENTS

| | | |
|---|---|---|
| JP | 7-183047 A | 7/1995 |
| JP | 2010040218 | * 2/2010 |

(Continued)

*Primary Examiner* — Jayne L Mershon
(74) *Attorney, Agent, or Firm* — Sughrue Mion, PLLC (57) ABSTRACT

Disclosed is an all-solid-state lithium ion secondary battery being excellent in cycle characteristics. The all-solid-state lithium ion secondary battery may be an all-solid-state lithium ion secondary battery, wherein an anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; and wherein a bulk density of the solid electrolyte is 0.3 g/cm$^3$ or more and 0.6 g/cm$^3$ or less.

3 Claims, 1 Drawing Sheet

(51) Int. Cl.
  *H01M 4/62* (2006.01)
  *H01M 4/134* (2010.01)
  *H01M 4/38* (2006.01)
  *H01M 4/02* (2006.01)
(52) U.S. Cl.
  CPC ....... *H01M 4/625* (2013.01); *H01M 10/0525* (2013.01); *H01M 2004/021* (2013.01); *H01M 2004/027* (2013.01); *H01M 2300/008* (2013.01)

(56) References Cited

FOREIGN PATENT DOCUMENTS

| | | |
|---|---|---|
| JP | 2012-129150 A | 7/2012 |
| JP | 2013-069416 A | 4/2013 |
| JP | 2014-137869 A | 7/2014 |
| JP | 2016-141574 A | 8/2016 |

* cited by examiner

ALL-SOLID-STATE LITHIUM ION SECONDARY BATTERY

CROSS REFERENCE TO RELATED APPLICATIONS

This application is a National Stage of International Application No. PCT/JP2018/015581 filed Apr. 13, 2018, claiming priority based on Japanese Patent Application No. 2017-082243 filed Apr. 18, 2017.

TECHNICAL FIELD

The disclosure relates to an all-solid-state lithium ion secondary battery.

BACKGROUND ART

An active material (an alloy-based active material) containing a metal such as Si, the metal being able to form an alloy with Li, has a large theoretical capacity per volume compared to carbon-based anode active materials. Therefore, a lithium ion battery using such an alloy-based active material in its anode, has been proposed.

Patent Literature 1 discloses a negative electrode mixture for a secondary battery, the mixture comprising, as a negative electrode active material powder, an alloy-based active material having an average particle diameter of 10 μm or less. Patent Literature 1 also discloses an all-solid lithium ion battery comprising an anode layer that contains the negative electrode active material powder.

CITATION LIST

Patent Literature 1: Japanese Patent Application Laid-Open No. 2013-69416

SUMMARY OF INVENTION

Technical Problem

However, the all-solid-state lithium ion secondary battery as disclosed in Patent Literature 1 which uses an alloy-based active material as an anode active material, shows a low capacity retention rate when it repeats charge-discharge cycles.

In light of this circumstance, an object of the disclosed embodiments is to provide an all-solid-state lithium ion secondary battery including an anode that comprises, as an anode active material, at least one selected from the group consisting of a metal that is able to form an alloy with Li, an oxide of the metal, and an alloy of the metal and Li, and being excellent in cycle characteristics.

Solution to Problem

The all-solid-state lithium ion secondary battery according to the disclosed embodiments is an all-solid-state lithium ion secondary battery, wherein an anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; wherein the solid electrolyte is a LiX—$Li_2S$—$P_2S_5$-based solid electrolyte (where X is at least one halogen selected from the group consisting of F, Cl, Br and I); and wherein bulk density of the solid electrolyte is 0.3 $g/cm^3$ or more and 0.6 $g/cm^3$ or less.

The bulk density of the solid electrolyte may be 0.40 $g/cm^3$ or more and 0.48 $g/cm^3$ or less.

The anode active material may comprise at least one active material selected from the group consisting of elemental silicon and an alloy of Si and Li.

The electroconductive material may be at least one carbonaceous material selected from the group consisting of carbon black, carbon nanotube and carbon nanofiber.

Advantageous Effects of Invention

According to the disclosed embodiments, the all-solid-state lithium ion secondary battery can be provided, the battery including an anode that comprises, as an anode active material, at least one active material selected from the group consisting of a metal that is able to form an alloy with Li, an oxide of the metal, and an alloy of the metal and Li, and being excellent in cycle characteristics.

DESCRIPTION OF EMBODIMENTS

The all-solid-state lithium ion secondary battery according to the disclosed embodiments is an all-solid-state lithium ion secondary battery, wherein an anode comprises an anode active material, an electroconductive material and a solid electrolyte; wherein the anode active material comprises at least one active material selected from the group consisting of a metal that is able to form an alloy with Li, an oxide of the metal, and an alloy of the metal and Li; wherein the solid electrolyte is a LiX—$Li_2S$—$P_2S_5$-based solid electrolyte (where X is at least one halogen selected from the group consisting of F, Cl, Br and I); and wherein a bulk density of the solid electrolyte is 0.3 $g/cm^3$ or more and 0.6 $g/cm^3$ or less.

The metal that is able to form an alloy with Li is low in ion conductivity and electron conductivity. Therefore, when the metal is used as an anode active material, generally, an electroconductive material and a solid electrolyte are incorporated in the anode, in combination with the anode active material.

When the metal that is able to form an alloy with Li (hereinafter, the metal that is able to form an alloy with Li may be referred to as M) is used as the anode active material, along with the charging of the lithium ion secondary battery, the reaction represented by the following formula (1), that is, a so-called electrochemical alloying reaction, is initiated in the anode:

$$xLi^+ + xe^- + yM \rightarrow Li_xM_y \quad \text{Formula (1)}$$

Along with the discharging of the lithium ion secondary battery, as represented by the following formula (2), an extraction reaction of Li ions from the alloy of Si and Li, is initiated in the anode:

$$Li_xM_y \rightarrow xLi^+ + xe^- + yM \quad \text{Formula (2)}$$

The lithium ion secondary battery using the metal that is able to form an alloy with Li as the anode active material, undergoes a large volume change in association with the Li insertion/extraction reactions represented by the formulae (1) and (2).

Patent Literature 1 describes that the average particle diameter of a powder of an ion conductive material (solid electrolyte) is preferably small because, as the average particle diameter decreases, contact points between the anode active material and the solid electrolyte increases.

However, it was found when there are many spaces in the anode of the all-solid-state lithium ion secondary battery, aggregation of the electroconductive material is likely to occur in the anode; therefore, in the case of using an alloy-based anode active material such as Si, an electron conducting path in the anode is blocked and, as a result, the capacity retention rate of the battery may deteriorate especially at the initial stage.

The solid electrolyte occupies a large portion of the volume of the anode. For a solid electrolyte having a uniform density, there is such a correlation that the smaller the bulk density, the larger the number of the spaces in the anode. As used herein, the "spaces in the anode" means parts where at least the solid electrolyte does not exist. Therefore, the electroconductive material is unevenly distributed in the anode and narrows the electron conducting path in the area where the amount of the electroconductive material is small.

As just described, in the area where the electron conducting path is narrow, the electron conducting path is gradually cut by repeating a volume change of the alloy-based active material in association with charging and discharging. As a result, it is considered that the capacity retention rate of the lithium ion secondary battery deteriorates.

In the all-solid-state lithium ion secondary battery of the disclosed embodiments, by using, in the anode, the solid electrolyte having a bulk density in a specific range, uneven distribution of the electroconductive material can be prevented, while maintaining excellent ion conductivity. Therefore, it is considered that the capacity retention rate can be kept high even when the alloy-based active material is used as the anode active material.

Hereinafter, the all-solid-state lithium ion secondary battery of the disclosed embodiments will be described in detail.

1. All-Solid-State Lithium Ion Secondary Battery

Figure 1:
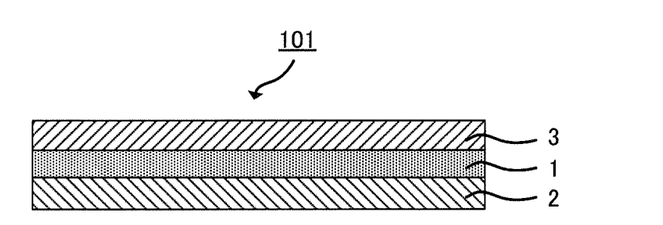
FIG. 1 is a schematic view of an example of the structure of an all-solid-state lithium ion secondary battery.

The structure of the all-solid-state lithium ion secondary battery of the disclosed embodiments is not particularly limited, as long as the battery functions as a secondary battery. As shown in FIG. 1, typically, the all-solid-state lithium ion secondary battery of the disclosed embodiments comprises a cathode 2, an anode 3 and a solid electrolyte layer 1 disposed between the cathode 2 and the anode 3, which form a cathode-solid electrolyte layer-anode assembly 101. The cathode-solid electrolyte layer-anode assembly 101 is an assembly of members having the following array structure: the cathode, the solid electrolyte layer and the anode are arranged in this order; they may be directly attached or indirectly attached through a part composed of a different material; and a part composed of a different material may be attached to one or both of the opposite side of the cathode to the position where the solid electrolyte layer is present (the outer side of the cathode) and the opposite side of the anode to the position where the solid electrolyte layer is present (the outer side of the anode).

By attaching other members such as a current collector to the cathode-solid electrolyte layer-anode assembly 101, a cell, which is a functional unit of an all-solid-state battery, is obtained. The cell can be used as it is as an all-solid-state lithium ion battery, or a plurality of the cells can be electrically connected to form a cell assembly and used as the all-solid-state lithium ion battery of the disclosed embodiments.

For the cathode-solid electrolyte layer-anode assembly, generally, the thicknesses of the cathode and the anode are from about 0.1 µm to about 10 mm, and the thickness of the solid electrolyte layer is from about 0.01 µm to about 1 mm.

1-1. Anode

The anode of the disclosed embodiments comprises an anode active material, an electroconductive material and a solid electrolyte.

(Anode Active Material)

The anode active material comprises at least one active material selected from the group consisting of a metal that is able to form an alloy with Li, an oxide of the metal, and an alloy of the metal and Li.

The metal that is able to form an alloy with Li is not particularly limited, as long as it is a metal that can insert/extract Li ions along with the so-called electrochemical alloying reaction represented by the formulae (1) and (2). As the metal element that is able to form an alloy with Li, examples include, but are not limited to, Mg, Ca, Al, Si, Ge, Sn, Pb, Sb and Bi. Of them, the metal that is able to form an alloy with Li may be Si, Ge or Sn, and it may be Si. In the disclosed embodiments, the term "metal" is used as a concept including the following terms that are used for general classification of elements: "metal" and "semimetal".

The anode active material may comprise at least one active material selected from the group consisting of elemental silicon and an alloy of Si and Li.

The oxide of the metal that is able to form an alloy with Li, means such an oxide that along with the charging of the lithium ion secondary battery, M is produced in the anode by the electrochemical reaction represented by the following formula (3):

$$x\text{Li}^+ + xe^- + y\text{MO} \rightarrow \text{Li}_x\text{O}_y + y\text{M} \qquad \text{Formula (3)}$$

By the electrochemical reaction represented by the formula (1) or (2), Li can be inserted in and extracted from the M produced from the oxide of the metal that is able to form an alloy with Li by the formula (3). Therefore, generally, the oxide of the metal that is able to form an alloy with Li is classified into the category of alloy-based active materials. As with the metal that is able to form an alloy with Li, the oxide of the metal that is able to form an alloy with Li, has such a property that it undergoes a large volume change in association with the Li insertion/extraction reactions.

As the oxide of the metal that is able to form an alloy with Li, examples include, but are not limited to, SiO and SnO. The oxide may be SiO.

The percentage of the anode active material in the anode is not particularly limited. For example, it may be 40 mass % or more, may be in a range of from 50 mass % to 90 mass %, or may be in a range of from 50 mass % to 70 mass %.

The form of the metal that is able to form an alloy with Li, the oxide of the metal, and the alloy of the metal and Li, is not particularly limited. As the form, examples include, but are not limited to, a particle form and a film form.

(Solid Electrolyte)

A raw material for the solid electrolyte is a LiX—Li$_2$S—P$_2$S$_5$-based solid electrolyte. X is at least one halogen selected from the group consisting of F, Cl, Br and I.

As the LiX—Li$_2$S—P$_2$S$_5$-based solid electrolyte, examples include, but are not limited to, LiI—Li$_2$S—P$_2$S$_5$, LiCl—Li$_2$S—P$_2$S$_5$, LiF—Li$_2$S—P$_2$S$_5$ and LiBr—LiI—Li$_2$S—P$_2$S$_5$. Of them, LiI—Li$_2$S—P$_2$S$_5$ and LiBr—LiI—Li$_2$S—P$_2$S$_5$ are preferred. The densities of these solid electrolytes are almost the same.

The percentage of the solid electrolyte in the anode is not particularly limited. For example, it may be 10 mass % or more, may be in a range of from 20 mass % to 50 mass %, or may be in a range of from 25 mass % to 45 mass %.

The density of the raw material for the solid electrolyte may be from 2.0 to 2.5 g/cm$^3$. If the density is in this range, the effect of the disclosed embodiments can be exerted as long as the bulk density is in the above-specified range.

The bulk density of the solid electrolyte is 0.3 g/cm$^3$ or more and 0.6 g/cm$^3$ or less. As described above, by using the solid electrolyte having a bulk density of 0.3 g/cm$^3$ or more and 0.6 g/cm$^3$ or less as the solid electrolyte in the anode, the capacity retention rate can be kept high.

When the bulk density is more than 0.6 g/cm$^3$, there is no space in the anode. Therefore, the dispersibility of the solid electrolyte and anode active material deteriorates and results in an increase in resistance. On the other hand, when the bulk density is less than 0.3 g/cm$^3$, the electroconductive material is unevenly distributed in the anode. Therefore, the electron conducting path is locally narrowed and results in a decrease in capacity retention rate.

To maintain the ion conducting path and the electron conducting path with balance, the bulk density of the solid electrolyte may be 0.31 g/cm$^3$ or more and 0.59 g/cm$^3$ or less, or it may be 0.32 g/cm$^3$ or more and 0.57 g/cm$^3$ or less.

The bulk density of the solid electrolyte may be 0.40 g/cm$^3$ or more and 0.48 g/cm$^3$ or less. By using the solid electrolyte having a bulk density of 0.40 g/cm$^3$ or more and 0.48 g/cm$^3$ or less as the solid electrolyte in the anode, as described above, the capacity retention rate can be kept high. In addition, since secondary aggregates of the solid electrolyte can be relatively easily pulverized, the secondary particle diameter (reaching particle diameter) of the solid electrolyte that is finally obtained after pulverizing, can be kept relatively small.

If the bulk density of the solid electrolyte is more than 0.48 g/cm$^3$, it may be relatively difficult to pulverize the secondary aggregates of the solid electrolyte, and there is a possibility that the secondary particle diameter (reaching particle diameter) of the finally obtained solid electrolyte is large. On the other hand, if the bulk density of the solid electrolyte is less than 0.40 g/cm$^3$, the electroconductive material may be easily distributed unevenly in the anode. Accordingly, there is a possibility that an electron conducting path is locally narrowed and, as a result, there is a possibility of a decrease in capacity retention rate.

In the disclosed embodiments, the bulk density of the solid electrolyte is measured as follows. First, a specific mass of the solid electrolyte is put in a graduated cylinder having an appropriate capacity. Next, after the lateral surface of the graduated cylinder is tapped 50 times, the volume of the solid electrolyte is read on the cylinder graduation. A value is obtained by dividing the mass (g) of the solid electrolyte by the volume (cm$^3$) read on the cylinder graduation, and the value is determined as the bulk density (g/cm$^3$) of the solid electrolyte.

An example of the method for obtaining the solid electrolyte having a bulk density of 0.3 g/cm$^3$ or more and 0.6 g/cm$^3$ or less, will be described below.

First, the LiX—Li$_2$S—P$_2$S$_5$-based solid electrolyte, a dispersion medium, and dispersing balls are put in a container. Mechanical milling is carried out using the container, thereby pulverizing the LiX—Li$_2$S—P$_2$S$_5$-based solid electrolyte. The pulverizing treatment may be carried out only one time, or it may be carried out two or more times. A mixture thus obtained is appropriately subjected to a heat treatment, thereby obtaining the solid electrolyte having a bulk density in the above numerical range.

When the solid electrolyte is particles, the form of the solid electrolyte particles is not particularly limited. As the form of the solid electrolyte particles, examples include, but are not limited to, a polygonal form (a prism form), a flat form (a plate form) and a spherical form. Of them, the form of the solid electrolyte particles may be a polygonal form, from the viewpoint of using the solid electrolyte particles having a bulk density of 0.3 g/cm$^3$ or more and 0.6 g/cm$^3$ or less, especially the solid electrolyte particles having a bulk density of 0.40 g/cm$^3$ or more and 0.48 g/cm$^3$ or less.

(Electroconductive Material)

The electroconductive material is not particularly limited, as long as it is an electroconductive material that is, in the anode, applicable to the all-solid-state lithium ion secondary battery. As the raw material for the electroconductive material, examples include, but are not limited to, at least one carbonaceous material selected from the group consisting of carbon black (e.g., acetylene black and furnace black), carbon nanotube and carbon nanofiber.

From the viewpoint of electron conductivity, the raw material may be at least one carbonaceous material selected from the group consisting of carbon nanotube and carbon nanofiber. The carbon nanotube and carbon nanofiber may be vapor-grown carbon fiber (VGCF).

The percentage of the electroconductive material in the anode is not particularly limited. For example, it is 1.0 mass % or more, may be in a range of from 1.0 mass % to 12 mass %, or may be in a range of from 2.0 mass % to 10.0 mass %.

In addition to the above-mentioned components, the anode may contain other components such as a binder. This is because, due to the use of the solid electrolyte having a bulk density of 0.3 g/cm$^3$ or more and 0.6 g/cm$^3$ or less, the presence or absence of the other components such as a binder in the anode, does not affect the effect of preventing the electroconductive material from being unevenly distributed on the solid electrolyte surface.

As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

Since a high energy density is obtained, the anode of the disclosed embodiments may be an anode in which the volume percentage of components other than the anode active material, is small.

1-2. Cathode

The cathode is not particularly limited, as long as it is a cathode that functions as the cathode of the all-solid-state lithium ion secondary battery. In general, the cathode contains a Li-containing cathode active material. As needed, the cathode contains other components such as a binder, a solid electrolyte and an electroconductive material.

In the disclosed embodiments, the Li-containing cathode active material is not particularly limited, as long as it is an active material that contains a Li element. A substance can be used as the cathode active material without particular limitation, as long as it functions as the cathode active material in an electrochemical reaction in relation to the anode active material, and it promotes an electrochemical reaction that involves Li ion transfer. Also, a substance that is known as the cathode active material of a lithium ion battery, can be used in the disclosed embodiments.

The raw material for the cathode active material is not particularly limited, as long as it is a raw material that is applicable to the all-solid-state lithium ion secondary battery. As the raw material, examples include, but are not limited to, lithium cobaltate (LiCoO$_2$), lithium nickelate (LiNiO$_2$), lithium manganate (LiMn$_2$O$_4$), a different element-substituted Li—Mn spinel of the composition represented by Li$_{1+x}$Ni$_{1/3}$Mn$_{1/3}$Co$_{1/3}$O$_2$, Li$_{1+x}$Mn$_{2-x-y}$M$_y$O$_4$ (where M is one or more elements selected from Al, Mg, Co, Fe, Ni and Zn), lithium titanate (Li$_x$TiO$_y$) and lithium metal phosphate (LiMPO$_4$, M=Fe, Mn, Co, Ni, etc.)

The cathode active material may include a coating layer which has lithium ion conductivity and which contains a substance that is not fluidized even when it is in contact with the active material or solid electrolyte. As the substance, examples include, but are not limited to, LiNbO$_3$, Li$_4$Ti$_5$O$_{12}$ and Li$_3$PO$_4$.

The form of the cathode active material is not particularly limited. It may be a film form or particle form.

The percentage of the cathode active material in the cathode is not particularly limited. For example, it may be 60 mass % or more, may be in a range of from 70 mass to 95 mass %, or may be in a range of from 80 mass % to 90 mass %.

As the raw material for the solid electrolyte, the raw material for the electroconductive material and the raw material for the binder, the same materials as those used in the anode, can be used.

1-3. Solid Electrolyte Layer

The solid electrolyte layer is not particularly limited, as long as it is a solid electrolyte layer that functions as the solid electrolyte of the all-solid-state lithium secondary battery. In general, the solid electrolyte layer contains a solid electrolyte raw material. As needed, it contains other components such as a binder.

As the raw material for the solid electrolyte and the raw material for the binder, the same materials as those used in the anode, can be used.

The percentage of the solid electrolyte raw material in the solid electrolyte layer is not particularly limited. For example, it may be 50 mass % or more, may be in a range of from 70 mass % to 99.99 mass %, or may be in a range of from 90 mass % to 99.9 mass %.

2. Method for Producing the all-Solid-State Lithium Ion Secondary Battery

The method for producing the all-solid-state lithium ion secondary battery according to the disclosed embodiments, is not particularly limited, as long as it is a method by which the all-solid-state lithium ion secondary battery of the disclosed embodiments can be produced. For example, the all-solid-state lithium ion secondary battery of the disclosed embodiments can be obtained by preparing a battery member comprising a cathode mixture, a solid electrolyte material part, and an anode mixture that contains an anode active material, an electroconductive material and a solid electrolyte, and passing electricity through the battery member.

By passing electricity, the electrochemical alloying reaction as represented by the formula (1) is initiated. As a result, the metal in the anode active material reacts with lithium ions to produce an alloy of the metal and Li.

The method for passing electricity through the battery member is not particularly limited. To efficiently promote the electrochemical alloying reaction as represented by the formula (1), current density may be in a range of from 0.1 to 6.0 mA/cm$^2$, or voltage may be in a range of from 4.3 to 4.7 V (vs Li/Li$^+$).

Hereinafter, the anode mixture, the cathode mixture, the solid electrolyte material part and the battery member, all of which are prepared in other steps, will be described.

2-1. Anode Mixture

The anode mixture contains an anode active material, an electroconductive material and a solid electrolyte. The anode mixture is not particularly limited, as long as the anode active material is a metal that is able to form an alloy with Li, and the bulk density of the solid electrolyte is 0.3 g/cm$^3$ or more and 0.6 g/cm$^3$ or less.

As described above, the anode can be obtained from the anode mixture by passing electricity through the battery member.

As needed, the anode mixture may contain other components such as a binder, in addition to the anode active material, the electroconductive material and the solid electrolyte.

This is because, as long as the bulk density of the solid electrolyte is 0.3 g/cm$^3$ or more and 0.6 g/cm$^3$ or less, the electroconductive material can be kept in an evenly dispersed state in the anode mixture and the anode produced from the anode mixture.

As the raw materials for the components such as the anode active material, which is a metal that is able to form an alloy with Li, the electroconductive material, the solid electrolyte and the binder, which is a component incorporated as needed, the same raw materials as those exemplified in the above "1-1. Anode" can be used.

The raw material for forming the anode mixture, that is, the raw material for the anode mixture, may contain components other than the raw materials for the anode active material, the electroconductive material, the solid electrolyte and the binder, which is incorporated as needed. In addition, the raw material for the anode mixture may contain components that are removed in the process of forming the anode mixture. As the components that are contained in the raw material for the anode mixture and removed in the process of forming the anode mixture, examples include, but are not limited to, a solvent and a removable binder. As the removable binder, such a binder can be used, that functions as the binder in the formation of the anode mixture and is decomposed or volatilized and removed by sintering in the step of obtaining the anode mixture, thereby providing a binder-free anode mixture.

The method for forming the anode mixture is not particularly limited. This is because, by using a material having a bulk density of 0.3 g/cm$^3$ or more and 0.6 g/cm$^3$ or less as the raw material for the solid electrolyte, the electroconductive material can be kept in an evenly dispersed state in the anode mixture thus formed and the anode produced from the anode mixture.

As the method for forming the anode mixture, examples include, but are not limited to, a method for compression-forming a powder of the raw material for the anode mixture. In the case of compression-forming the powder of the raw material for the anode mixture, generally, a press pressure of from about 400 to about 1,000 MPa is applied. The compression-forming may be carried out by using a roll press. In this case, a line pressure may be set to 10 to 100 kN/cm.

Also, the following methods can be adopted: a method in which a powder of the raw material for the anode mixture containing the removable binder, is subjected to compression forming and then sintered to remove the binder, and a method in which a dispersion of the raw material for the anode mixture containing the solvent and the removable binder, is applied on the solid electrolyte material part or on a different support, dried, formed into the anode mixture and then sintered to remove the binder.

2-2. Cathode Mixture

In the production method of the disclosed embodiments, the cathode mixture contains, for example, a Li-containing cathode active material. As needed, it contains other raw materials such as a binder, a solid electrolyte and an electroconductive material.

As just described, by passing electricity through the battery member, the cathode can be obtained from the cathode mixture.

As the other raw materials such as the binder, the electroconductive material and the solid electrolyte, the same raw materials as those exemplified above in "1-2. Cathode" can be used.

The raw material for forming the cathode mixture, that is, the raw material for the cathode mixture may further contain components that are removed in the process of forming the cathode mixture. As the components that are contained in the raw material for the cathode mixture and removed in the process of forming the cathode mixture, examples include, but are not limited to, the same components as the solvent that can be incorporated in the raw material for the anode mixture and the removable binder.

As the method for forming the cathode mixture, examples include, but are not limited to, the same method as the method for forming the anode mixture.

2-3. Solid Electrolyte Material Part

In the production method of the disclosed embodiments, the solid electrolyte material part contains a solid electrolyte raw material, for example. As needed, it contains other components.

As described above, by passing electricity through the battery member, the solid electrolyte layer can be obtained from the solid electrolyte material part.

As the solid electrolyte raw material, the same materials as those exemplified above in "1-3. Solid electrolyte layer" can be used.

The percentage of the solid electrolyte raw material in the solid electrolyte material part is not particularly limited. For example, it may be 50 mass % or more, may be in a range of from 70 mass % to 99.99 mass %, or may be in a range of from 90 mass % to 99.9 mass %.

As the other components contained in the solid electrolyte material part, the same materials as those exemplified above in "1-3. Solid electrolyte layer" can be used.

As the method for forming the solid electrolyte material part, examples include, but are not limited to, a method for compression-forming a powder of the solid electrolyte material containing the solid electrolyte raw material and, as needed, other components. In the case of compression-forming the powder of the solid electrolyte material, generally, as with the case of compression-forming the powder of the anode mixture, a press pressure of from about 400 to about 1,000 MPa is applied. The compression-forming may be carried out by using a roll press. In this case, a line pressure may be set to 10 to 100 kN/cm.

As a different method, a cast film forming method can be used, which uses a solution or dispersion of the solid electrolyte material that contains the solid electrolyte raw material and, as needed, other components.

2-4. Battery Member

In the production method of the disclosed embodiments, the battery member in the disclosed embodiments is an assembly of members having the following array structure, for example: the cathode mixture, the solid electrolyte material part and the anode mixture are arranged in this order; they may be directly attached or indirectly attached through a part composed of a different material; and a part composed of a different material may be attached to one or both of the opposite side of the cathode mixture to the position where the solid electrolyte material part is present (the outer side of the cathode mixture) and the opposite side of the anode mixture to the position where the solid electrolyte material part is present (the outer side of the anode mixture) (i.e., a cathode mixture-solid electrolyte material part-anode mixture assembly).

A part composed of a different material may be attached to the battery member, as long as electricity can be passed in the direction from the cathode mixture side to the anode mixture side through the solid electrolyte material part. A coating layer such as $LiNbO_3$, $Li_4Ti_5O_{12}$ or $Li_3PO_4$ may be disposed between the cathode mixture and the solid electrolyte material part. A current collector, an outer casing, etc., may be attached to one or both of the outer side of the cathode mixture and the outer side of the anode mixture.

The battery member is typically an assembly having the following array structure: the cathode mixture, the anode mixture and the solid electrolyte material part disposed between the cathode mixture and the anode mixture are directly attached, and a part composed of a different material is not attached to both the outer side of the cathode mixture and the outer side of the anode mixture.

The method for producing the battery member is not particularly limited. For example, the battery member may be produced as follows: the powder of the raw material for the anode mixture is put in a compression cylinder for powder compression forming and deposited to a uniform thickness, thereby forming a layer of the powder of the raw material for the anode mixture; a powder of the raw material for the solid electrolyte, which contains the solid electrolyte powder and, as needed, other components, is placed on the layer of the powder of the raw material for the anode mixture and deposited to a uniform thickness, thereby forming a layer of the powder of the raw material for the solid electrolyte; a powder of the raw material for the cathode mixture, which contains the Li-containing cathode active material, is placed on the layer of the powder of the raw material for the solid electrolyte and deposited to a uniform thickness, thereby forming a layer of the powder of the raw material for the cathode mixture; and a powder deposit composed of the three powder deposited layers formed in this manner, is subjected to compression-forming at once, thereby producing the battery member.

The solid electrolyte material part, the anode mixture and the cathode mixture may be produced by a method other than the powder compression forming. Details of the method are as described above. For example, the solid electrolyte material part may be formed by the cast film forming method or a coating method with a die coater, using the solution or dispersion of the solid electrolyte material containing the solid electrolyte raw material. The anode mixture and the cathode mixture may be formed by the following method, for example: a method in which the dispersion containing the powder of the raw material for the anode mixture or cathode mixture and the removable binder, is applied on the solid electrolyte material part to form a coating film, and the coating film is heated to remove the binder from the coating film, or a method in which the powder containing the raw material for the anode mixture or cathode mixture and the removable binder, is subjected to compression forming to form the powder into the cathode mixture or anode mixture, and the thus-formed product is heated to remove the binder from the coating film. To increase electrode density, the anode mixture and the cathode mixture may be subjected to densification pressing in advance before the compression forming.

The anode mixture and the cathode mixture may be formed on a support other than the solid electrolyte material part. In this case, the anode mixture and the cathode mixture are removed from the support, and the removed anode mixture or cathode mixture is attached on the solid electrolyte material part.

An example of the method for calculating the discharge capacity retention rate of the all-solid-state lithium ion secondary battery according to the disclosed embodiments, will be described below.

First, the battery is charged with constant current-constant voltage until a predetermined voltage is reached. Next, the charged battery is discharged with constant current-constant voltage. The charging and discharging is determined as one cycle, and X cycles are repeated.

The discharge capacity retention rate after the X cycles is calculated by the following formula (4):

$$r=(C_X/C_{1st})\times 100 \quad \text{Formula (4)}$$

In the formula (4), r is the discharge capacity retention rate after the X cycles; $C_X$ is the discharge capacity (mAh) at the X-th cycle; and $C_{1st}$ is the discharge capacity (mAh) at the first cycle. The value of X is not particularly limited; however, since the initial discharge capacity retention rate is easily influenced by uneven distribution of the electroconductive material in the anode, X may be 10 or less, or it may be 5.

EXAMPLES

Hereinafter, the disclosed embodiments will be further clarified by the following examples. The disclosed embodiments are not limited to the following examples, however.

Example Series I

I-1. Production of all-Solid-State Lithium Ion Secondary Battery

Example I-1

(1) The Step of Forming Solid Electrolyte Particles for Anode

The following materials were put in a $ZrO_2$ pod (45 mL).
  Sulfide-based solid electrolyte (15LiBr-10LiI-75(75Li$_2$S-25P$_2$S$_5$)): 2 g
  Dehydrated heptane: 7 g
  Di-n-butyl ether: 1 g
  $ZrO_2$ balls (diameter 1 mm): 40 g The inside of the $ZrO_2$ pod containing these materials, was filled with an argon atmosphere. Then, the pod was hermetically closed, absolutely. The $ZrO_2$ pod was installed in a planetary ball mill (product name: P7, manufactured by: FRITSCH) and subjected to wet mechanical milling for 5 hours at a plate rotational frequency of 200 rpm, thereby pulverizing the sulfide-based solid electrolyte. Then, a mixture thus obtained was subjected to a heat treatment at 210° C. for 3 hours on a hot plate, thereby obtaining solid electrolyte particles for an anode.

Next, 10 g of the solid electrolyte particles for the anode were put in a graduated cylinder (100 cm$^3$). After the lateral surface of the graduated cylinder was tapped 50 times, the volume of the solid electrolyte particles was read on the cylinder graduation. The bulk density of the solid electrolyte particles for the anode calculated from the volume, was 0.57 g/cm$^3$.

(2) The Step of Forming Anode Mixture

The following raw materials for an anode were put in a container.
  Anode active material: Si particles (average particle diameter: 5 μm)
  Sulfide-based solid electrolyte: The above-mentioned solid electrolyte particles for the anode
  Electroconductive material: VGCF
  Binder: 5 Mass % butyl butyrate solution of a PVdF-based binder The content of the electroconductive material in the mixture of the above-mentioned raw materials for the anode, was controlled so that the volume percentage of the electroconductive material is 2.5 volume % when the total volume of an anode mixture thus obtained is determined as 100%.

The mixture in the container was stirred for 30 seconds by an ultrasonic disperser. Next, the container was shaken for 3 minutes by a shaker, thereby preparing a raw material for an anode mixture.

The raw material for the anode mixture was applied on one surface of a copper foil (an anode current collector) by a blade method using an applicator. The applied raw material for the anode mixture was dried on the hot plate at 100° C. for 30 minutes, thereby forming an anode mixture.

(3) The Step of Forming Cathode Mixture

The following raw materials for a cathode were put in a container.
  Cathode active material: LiNi$_{1/3}$Co$_{1/3}$Mn$_{1/3}$O$_2$ particles (average particle diameter: 4 μm)
  Sulfide-based solid electrolyte: Li$_2$S—P$_2$S$_5$-based glass ceramics particles containing LiBr and LiI (average particle diameter: 0.8 μm)
  Electroconductive material: VGCF
  Binder: 5 Mass % butyl butyrate solution of a PVdF-based binder The mixture in the container was stirred for 30 seconds by the ultrasonic disperser. Next, the container was shaken for 3 minutes by the shaker. The mixture in the container was further stirred for 30 seconds by the ultrasonic disperser, thereby preparing a raw material for a cathode mixture.

The raw material for the cathode mixture was applied on one surface of an aluminum foil (a cathode current collector) by the blade method using the applicator. The applied raw material for the cathode mixture was dried on the hot plate at 100° C. for 30 minutes, thereby forming a cathode mixture.

(4) The Step of Producing Battery Member

The following raw materials for a solid electrolyte were put in a container.
  Sulfide-based solid electrolyte: Li$_2$S—P$_2$S$_5$-based glass particles containing LiBr and LiI (average particle diameter: 2.5 μm)
  Binder: 5 Mass % heptane solution of a BR-based binder The mixture in the container was stirred for 30 seconds by the ultrasonic disperser. Next, the container was shaken for 3 minutes by the shaker. A solid electrolyte material part thus obtained was applied to an aluminum foil by a die coater and dried on the hot plate at 100° C. for 30 minutes (a solid electrolyte layer). A total of three solid electrolyte layers were produced.

A laminate of the cathode mixture and the cathode current collector was pressed in advance. After the advance pressing, the solid electrolyte material part was applied on the cathode mixture-side surface of the laminate by the die coater and dried on the hot plate at 100° C. for 30 minutes, thereby obtaining a cathode side laminate I (the solid electrolyte material part/the cathode mixture/the cathode current collector).

In the same manner, a laminate of the anode mixture and the anode current collector was pressed in advance, and the solid electrolyte material part was applied and dried, thereby obtaining an anode side laminate I (the solid electrolyte material part/the anode mixture/the anode current collector).

To the solid electrolyte material part side of the cathode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the cathode side laminate I.
Pressure: 5 kN/cm
Roll gap: 100 μm
Feed rate: 0.5 m/min Then, the aluminum foil on the solid electrolyte layer side was peeled off, thereby obtaining a cathode side laminate II (the solid electrolyte material part/the cathode mixture/the cathode current collector).

To the solid electrolyte material part side of the anode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the anode side laminate I.
Pressure: 5 kN/cm
Roll gap: 100 μm
Feed rate: 0.5 m/min Then, the aluminum foil on the solid electrolyte layer side was peeled off, thereby obtaining an anode side laminate II (the solid electrolyte material part/the anode mixture/the anode current collector).

The cathode side laminate II subjected to the densification pressing, was cut by a jig (diameter: 11.28 mm). The anode side laminate II subjected to the densification pressing, was cut by a jig (diameter: 11.74 mm).

To the solid electrolyte material part side of the anode side laminate II, the solid electrolyte layer on the aluminum foil was further transferred. Then, the aluminum foil was peeled off, thereby obtaining an anode side laminate III (the solid electrolyte material part/the anode mixture/the anode current collector).

The cathode side laminate II and the anode side laminate III were stacked so that their surfaces, on each of which the solid electrolyte material part was formed, were in contact with each other. Also, the cathode side laminate II was arranged at the approximate center of the anode side laminate III. They were subjected to hot pressing under the following condition, thereby obtaining a battery member.
Pressure: 200 MPa
Temperature: 130° C.
Pressing time: One minute (5) The Step of Passing Electricity Electricity was passed through the thus-obtained battery member with constant voltage and constant current at a 3-hour rate (1/3 C) until a predetermined voltage was reached (cutoff current 1/100 C). Therefore, the all-solid-state lithium ion secondary battery of Example I-1 was obtained.

Example I-2

The all-solid-state lithium ion secondary battery of Example I-2 was produced in the same manner as Example I-1, except that "(1) The step of forming solid electrolyte particles for anode" was changed to the following process.

The following materials were put in the slurry tank of a bead mill (product name: LMZ4, manufactured by: Ashizawa Finetech Ltd.)
Sulfide-based solid electrolyte (15LiBr-10LiI-75 (75$Li_2$S-25$P_2S_5$)): 800 g
Dehydrated heptane: 5 kg
Di-n-butyl ether: 1.5 kg
$ZrO_2$ balls (diameter 0.3 mm): 13 kg The slurry tank containing the above materials was subjected to wet mechanical milling for 6 hours at a peripheral speed of 12 m/s, thereby pulverizing the sulfide-based solid electrolyte. Then, a mixture thus obtained was subjected to a heat treatment at 210° C. for 3 hours on the hot plate, thereby obtaining solid electrolyte particles for an anode.

The bulk density of the solid electrolyte particles for the anode calculated by the same method as Example I-1, was 0.33 g/$cm^3$.

Example I-3

The all-solid-state lithium ion secondary battery of Example I-3 was produced in the same manner as Example I-1, except that "(1) The step of forming solid electrolyte particles for anode" was changed to the following process.

The following materials were put in the slurry tank of the bead mill (product name: LMZ4, manufactured by: Ashizawa Finetech Ltd.)
Sulfide-based solid electrolyte (15LiBr-10LiI-75 (75$Li_2$S-25$P_2S_5$)): 800 g
Dehydrated heptane: 5 kg
Di-n-butyl ether: 1.5 kg
$ZrO_2$ balls (diameter 0.3 mm): 13 kg The slurry tank containing the above materials was subjected to wet mechanical milling for 10 minutes at a peripheral speed of 12 m/s, thereby pulverizing the sulfide-based solid electrolyte. Then, a mixture thus obtained was subjected to a heat treatment at 210° C. for 3 hours on the hot plate, thereby obtaining solid electrolyte particles for an anode.

The bulk density of the solid electrolyte particles for the anode calculated by the same method as Example I-1, was 0.32 g/$cm^3$.

Comparative Example I-1

The all-solid-state lithium ion secondary battery of Comparative Example I-1 was produced in the same manner as Example I-1, except that "(1) The step of forming solid electrolyte particles for anode" was changed to the following process.

The following materials were put in the slurry tank of a bead mill (product name: LMZ015, manufactured by: Ashizawa Finetech Ltd.)
Sulfide-based solid electrolyte (15LiBr-10LiI-75(75$Li_2$S-25$P_2S_5$)): 30 g
Dehydrated heptane: 200 g
Di-n-butyl ether: 80 g
$ZrO_2$ balls (diameter 0.3 mm): 450 g The slurry tank containing the above materials was subjected to wet mechanical milling for 4 hours at a peripheral speed of 16 m/s, thereby pulverizing the sulfide-based solid electrolyte. Then, a mixture thus obtained was subjected to a heat treatment at 210° C. for 3 hours on the hot plate, thereby obtaining solid electrolyte particles for an anode.

The bulk density of the solid electrolyte particles for the anode calculated by the same method as Example I-1, was 0.21 g/cm³.

I-2. Discharge Test

For battery performance evaluation, the four all-solid-state lithium ion secondary batteries was subjected to a discharge test by the following method.

First, each battery was charged with constant current-constant voltage at a 3-hour rate (1/3 C) until a predetermined voltage was reached. At this time, a cutoff current was set to 1/100 C. Next, the charged battery was discharged with constant current-constant voltage.

The charging and discharging was determined as one cycle, and 5 cycles were repeated.

The discharge capacity retention rate after the 5 cycles was calculated by the following formula (4a):

$$r = (C_5/C_{1st}) \times 100 \quad \text{Formula (4a)}$$

In the formula (4a), r is the discharge capacity retention rate (%) after the 5 cycles; $C_5$ is the discharge capacity (mAh) at the 5th cycle; and $C_{1st}$ is the discharge capacity (mAh) at the first cycle.

The discharge capacity retention rate after the 5 cycles of each of Examples I-1 to I-3 when the discharge capacity retention rate after the 5 cycles of Comparative Example I-1 is determined as 100%, was calculated and determined as the specific capacity retention rate after the 5 cycles of each of Examples I-1 to I-3.

The following Table I-1 shows, for comparison, the specific capacity retention rates after the 5 cycles of Examples I-1 to I-3 and Comparative Example I-1, along with the properties of the solid electrolyte particles for the anode.

TABLE I-1

| | Solid electrolyte particles for anode | | | |
|---|---|---|---|---|
| | BET specific surface area (m²/g) | Average particle diameter (μm) | Bulk density (g/cm³) | Specific capacity retention rate (%) after 5 cycles |
| Example I-1 | 1.8 | 3.3 | 0.57 | 109 |
| Example I-2 | 19.7 | 1.3 | 0.33 | 108 |
| Example I-3 | 5.7 | 2.0 | 0.32 | 109 |
| Comparative Example I-1 | 28.4 | 1.0 | 0.21 | 100 |

I-3. Consideration

As a result of comparing the specific capacity retention rates after the 5 cycles shown in Table I-1, Examples I-1 to I-3 are about 1.1 times higher than Comparative Example I-1. This is because, while the bulk density of the solid electrolyte for the anode used in Comparative Example I-1 is as low as 0.21 g/cm³, the bulk densities of the solid electrolytes for the anode used in Examples I-1 to I-3 are 0.32 g/cm³ or more and 0.57 g/cm³ or less.

Therefore, it was proved that the battery containing the solid electrolyte for the anode which has a bulk density of 0.3 g/cm³ or more and 0.6 g/cm³ or less, can inhibit a decrease in capacity and is excellent in cycle characteristics, compared to the battery containing the solid electrolyte for the anode which has a bulk density out of the numerical range.

Example Series II

II-1. Production of all-Solid-State Lithium Ion Secondary Battery

Example II-1

(1) The Step of Forming Solid Electrolyte Particles for Anode

A. First Pulverizing Treatment

The following materials and so on were put in the slurry tank of the bead mill (product name: LMZ015, manufactured by: Ashizawa Finetech Ltd.)

Sulfide-based solid electrolyte (15LiBr-10LiI-75(75Li₂S-25P₂S₅)): 50 g
Dehydrated heptane: 265 g
Di-n-butyl ether: 135 g
ZrO₂ balls (diameter 0.3 mm): 485 g The slurry tank containing the above materials and so on was subjected to wet mechanical milling for one hour at a peripheral speed of 16 m/s, thereby obtaining sulfide-based solid electrolyte particles in a flat form (a plate form).

The BET specific surface area of the sulfide-based solid electrolyte particles in the flat form was measured by a high speed specific surface area analyzer (product name: NOVA4200E, manufactured by: Quantachrome Instruments Japan G.K.) The BET specific surface area was 20 m²/g.

The median diameter of the sulfide-based solid electrolyte particles in the flat form was measured by a dynamic light scattering particle size distribution analyzer (product name: NANOTRAC WAVE II, manufactured by: MicrotracBEL Corp.) The median diameter was $D_{50}=2.0$ μm.

As a result of observation by a scanning electron microscope, the thickness of the sulfide-based solid electrolyte particles in the flat form was 0.2 μm.

B. Second Pulverizing Treatment

After the first pulverizing treatment, the mixture was further subjected to wet mechanical milling for three hours at a peripheral speed of 3 m/s, while keeping the mixture at a temperature of 40° C.

C. Drying Treatment

After the second pulverizing treatment, the mixture was subjected to a heat treatment at 120° C. for three hours on the hot plate to distill the dehydrated heptane away from the mixture. Then, a heat treatment at 210° C. for three hours was carried out, thereby obtaining solid electrolyte particles for an anode.

Next, 10 g of the solid electrolyte particles for the anode were put in a graduated cylinder (100 cm³). After the lateral surface of the graduated cylinder was tapped 50 times, the volume of the solid electrolyte particles was read on the cylinder graduation. The bulk density of the solid electrolyte particles for the anode was calculated from the volume. The bulk density was 0.45 g/cm³.

(2) The Step of Forming Anode Mixture

The following raw materials for an anode were put in a container.

Anode active material: Si particles (average particle diameter: 5 μm)
Sulfide-based solid electrolyte: The above-mentioned solid electrolyte particles for the anode
Electroconductive material: VGCF
Binder: 5 Mass % butyl butyrate solution of a PVdF-based binder The content of the electroconductive material in the mixture of the above-mentioned raw materials for the anode, was controlled so that the volume percentage of the electroconductive material is 2.5 volume % when the total volume of an anode mixture thus obtained is determined as 100%.

The mixture in the container was stirred for 30 seconds by the ultrasonic disperser. Next, the container was shaken for 30 minutes by a shaking device, thereby preparing a raw material for an anode mixture.

The raw material for the anode mixture was applied on one surface of a copper foil (an anode current collector) by the blade method using the applicator. The applied raw material for the anode mixture was dried on the hot plate at 100° C. for 30 minutes, thereby forming an anode mixture.

(3) The Step of Forming Cathode Mixture

The following raw materials for a cathode were put in a container.

Cathode active material: $LiNi_{1/3}Co_{1/3}Mn_{1/3}O_2$ particles (average particle diameter: 4 μm)
Sulfide-based solid electrolyte: $Li_2S$—$P_2S_5$-based glass ceramic particles containing LiBr and LiI (average particle diameter: 0.8 μm)
Electroconductive material: VGCF
Binder: 5 Mass % butyl butyrate solution of a PVdF-based binder The mixture in the container was stirred for 30 seconds by the ultrasonic disperser. Next, the container was shaken for 3 minutes by the shaking device. The mixture in the container was further stirred for 30 seconds by the ultrasonic disperser, thereby preparing a raw material for a cathode mixture.

The raw material for the cathode mixture was applied on one surface of an aluminum foil (a cathode current collector) by the blade method using the applicator. The applied raw material for the cathode mixture was dried on the hot plate at 100° C. for 30 minutes, thereby forming a cathode mixture.

(4) The Step of Producing Battery Member

The following raw materials for a solid electrolyte layer were put in a container.

Sulfide-based solid electrolyte: $Li_2S$—$P_2S_5$-based glass particles containing LiBr and LiI (average particle diameter: 2.5 μm)
Binder: 5 Mass % heptane solution of a BR-based binder The mixture in the container was stirred for 30 seconds by the ultrasonic disperser. Next, the container was shaken for 3 minutes by the shaking device. A solid electrolyte material part thus obtained was applied to an aluminum foil by a die coater and dried on the hot plate at 100° C. for 30 minutes (a solid electrolyte layer). A total of three solid electrolyte layers were produced.

A laminate of the cathode mixture and the cathode current collector was pressed in advance. After the advance pressing, the solid electrolyte material part was applied on the cathode mixture-side surface of the laminate by the die coater and dried on the hot plate at 100° C. for 30 minutes, thereby obtaining a cathode side laminate I (the solid electrolyte material part/the cathode mixture/the cathode current collector).

In the same manner, a laminate of the anode mixture and the anode current collector was pressed in advance, and the solid electrolyte material part was applied and dried, thereby obtaining an anode side laminate I (the solid electrolyte material part/the anode mixture/the anode current collector).

To the solid electrolyte material part side of the cathode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the cathode side laminate I.

Pressure: 5 kN/cm
Roll gap: 100 μm
Feed rate: 0.5 m/min

Then, the aluminum foil on the solid electrolyte layer side was peeled off, thereby obtaining a cathode side laminate II (the solid electrolyte material part/the cathode mixture/the cathode current collector).

To the solid electrolyte material part side of the anode side laminate I, the solid electrolyte layer on the aluminum foil was further attached. While being in this state, they were subjected to densification pressing under the following condition. By the densification pressing, the solid electrolyte layer on the aluminum foil was integrated with the solid electrolyte material part of the anode side laminate I.

Pressure: 5 kN/cm
Roll gap: 100 μm
Feed rate: 0.5 m/min

Then, the aluminum foil on the solid electrolyte layer side was peeled off, thereby obtaining an anode side laminate II (the solid electrolyte material part/the anode mixture/the anode current collector).

The cathode side laminate II subjected to the densification pressing, was cut by a jig (diameter: 11.28 mm). The anode side laminate II subjected to the densification pressing, was cut by a jig (diameter: 13.0 mm).

To the solid electrolyte material part side of the anode side laminate II, the solid electrolyte layer on the aluminum foil was further transferred. Then, the aluminum foil was peeled off, thereby obtaining an anode side laminate III (the solid electrolyte material part/the anode mixture/the anode current collector).

The cathode side laminate II and the anode side laminate III were stacked so that their surfaces, on each of which the solid electrolyte material part was formed, were in contact with each other. Also, the cathode side laminate II was arranged to be positioned at the approximate center of the anode side laminate III. They were subjected to hot pressing under the following condition, thereby obtaining a battery member.

Pressure: 200 MPa
Temperature: 130° C.
Pressing time: One minute (5) The Step of Passing Electricity Electricity was passed through the thus-obtained battery member with constant voltage and constant current at a 3-hour rate (1/3 C) until a predetermined voltage was reached (cutoff current 1/100 C). Therefore, the all-solid-state lithium ion secondary battery of Example II-1 was obtained.

Example II-2

The all-solid-state lithium ion secondary battery of Example II-2 was produced in the same manner as Example II-1, except that in "B. Second pulverizing treatment" of "(1) The step of forming solid electrolyte particles for anode", after the first pulverizing treatment, the mixture was subjected to wet mechanical milling for two hours at a peripheral speed of 3 m/s, while keeping the mixture at a temperature of 50° C.

The bulk density of the solid electrolyte particles for the anode was calculated by the same method as Example II-1. The bulk density was 0.40 g/cm³.

Example II-3

The all-solid-state lithium ion secondary battery of Example II-3 was produced in the same manner as Example II-1, except that in "A. First pulverizing treatment" of "(1) The step of forming solid electrolyte particles for anode", wet mechanical milling was carried out for two hours at a peripheral speed of 16 m/s, and in "B. Second pulverizing treatment", after the first pulverizing treatment, the mixture was subjected to wet mechanical milling for three hours at a peripheral speed of 3 m/s, while keeping the mixture at a temperature of 50° C.

The bulk density of the solid electrolyte particles for the anode was calculated by the same method as Example II-1. The bulk density was 0.48 g/cm$^3$.

The properties of the sulfide-based solid electrolyte particles in the flat form obtained after the first pulverizing treatment, are as follows.

The BET specific surface area of the sulfide-based solid electrolyte particles in the flat form was measured by the high speed specific surface area analyzer (product name: NOVA4200E, manufactured by: Quantachrome Instruments Japan G.K.) The BET specific surface area was 24 m$^2$/g.

The median diameter of the sulfide-based solid electrolyte particles in the flat form was measured by the dynamic light scattering particle size distribution analyzer (product name: NANOTRAC WAVE II, manufactured by: MicrotracBEL Corp.) The median diameter was $D_{50}$=1.2 μm.

As a result of observation by the scanning electron microscope, the thickness of the sulfide-based solid electrolyte particles in the flat form was 0.11 μm.

Comparative Example II-1

The all-solid-state lithium ion secondary battery of Comparative Example II-1 was produced in the same manner as Example II-1, except that in "B. Second pulverizing treatment" of "(1) The step of forming solid electrolyte particles for anode", after the first pulverizing treatment, the mixture was subjected to wet mechanical milling for three hours at a peripheral speed of 7 m/s, while keeping the mixture at a temperature of 50° C.

The bulk density of the solid electrolyte particles for the anode was calculated by the same method as Example II-1. The bulk density was 0.22 g/cm$^3$.

Comparative Example II-2

The all-solid-state lithium ion secondary battery of Comparative Example II-2 was produced in the same manner as Example II-1, except that "(1) The step of forming solid electrolyte particles for anode" was changed to the following process.

The following materials and so on were put in a ZrO$_2$ pod (500 mL).

Sulfide-based solid electrolyte (15LiBr-10LiI-75(75Li$_2$S-25P$_2$S$_5$)): 75 g
Dehydrated heptane: 120 g
Di-n-butyl ether: 80 g
ZrO$_2$ balls (diameter 0.3 mm): 400 g The inside of the ZrO$_2$ pod containing these materials, was filled with an argon atmosphere. Then, the pod was hermetically closed, absolutely. The ZrO$_2$ pod was installed in a planetary ball mill (product name: P-5, manufactured by: FRITSCH) and subjected to wet mechanical milling for 10 hours at a plate rotational frequency of 150 rpm (peripheral speed: 1.7 m/s), thereby pulverizing the sulfide-based solid electrolyte. Then, a mixture thus obtained was subjected to heat treatment at 120° C. for three hours on the hot plate to distill the dehydrated heptane away from the mixture. Then, a heat treatment at 210° C. for three hours was carried out, thereby obtaining solid electrolyte particles for an anode.

The bulk density of the solid electrolyte particles for the anode was calculated by the same method as Example II-1. The bulk density was 0.50 g/cm$^3$. As a result of observation by the scanning electron microscope, the form of the solid electrolyte particles for the anode was confirmed to be a spherical form. Also, the BET specific surface area and median diameter of the solid electrolyte particles for the anode were measured by the same methods as Example II-1. The BET specific surface area was 8 m$^2$/s, and the median diameter was $D_{50}$=0.7 μm.

Comparative Example II-3

The all-solid-state lithium ion secondary battery of Comparative Example II-3 was produced in the same manner as Example II-1, except that "(1) The step of forming solid electrolyte particles for anode" was changed to the following process.

The following materials and so on were put in the slurry tank of the bead mill (product name: LMZ015, manufactured by: Ashizawa Finetech Ltd.)

Sulfide-based solid electrolyte (15LiBr-10LiI-75(75Li$_2$S-25P$_2$S$_5$)): 50 g
Dehydrated heptane: 265 g
Di-n-butyl ether: 135 g
ZrO$_2$ balls (diameter 0.3 mm): 485 g The slurry tank containing the materials and so on was subjected to wet mechanical milling for 4 hours at a peripheral speed of 16 m/s, thereby pulverizing the sulfide-based solid electrolyte. Then, a mixture thus obtained was subjected to a heat treatment at 120° C. for three hours on the hot plate to distill the dehydrated heptane away from the mixture. Then, a heat treatment at 210° C. for three hours was carried out, thereby obtaining solid electrolyte particles for anode.

The bulk density of the solid electrolyte particles for the anode was calculated by the same method as Example II-1. The bulk density was 0.17 g/cm$^3$. As a result of observation by the scanning electron microscope, the form of the solid electrolyte particles for the anode was confirmed to be a flat form, and the thickness was 0.07 μm. Also, the BET specific surface area and median diameter of the solid electrolyte particles for the anode were measured by the same methods as Example II-1. The BET specific surface area was 28 m$^2$/s. The median diameter was $D_{50}$=0.7 μm.

II-2. Discharge Test

For battery performance evaluation, the above-mentioned six all-solid-state lithium ion secondary batteries was subjected to a discharge test by the following method.

First, each battery was charged with constant current and constant voltage at a 3-hour rate (1/3 C) until a predetermined voltage was reached. At this time, a cutoff current was set to 1/100 C. Next, the charged battery was discharged with constant current and constant voltage.

The charging and discharging were determined as one cycle, and 5 cycles were repeated.

The discharge capacity retention rate after the 5 cycles was calculated by the following formula (4a):

$$r = (C_5/C_{1st}) \times 100 \qquad \text{Formula (4a)}$$

where r is the discharge capacity retention rate (%) after the 5 cycles; $C_5$ is the discharge capacity (mAh) at the 5th cycle; and $C_{1st}$ is the discharge capacity (mAh) at the first cycle.

For Examples II-1 to II-3 and Comparative Examples II-2 and II-3, the discharge capacity retention rate after the 5 cycles when the discharge capacity retention rate after the 5 cycles of Comparative Example II-1 is determined as 100%, was calculated and determined as the specific capacity retention rate after the 5 cycles of each all-solid-state lithium ion secondary battery.

II-3. Measurement of Secondary Particle Diameter of Solid Electrolyte Particles for Anode after Pulverizing For the solid electrolyte particles for the anode used in the six all-solid-state lithium ion secondary batteries, the secondary particle diameter was measured by the following method.

First, 250 g of the thus-obtained solid electrolyte particles for the anode and 350 g of butyl butyrate were mixed to obtain a mixture. The mixture was pulverized for minutes by an ultrasonic homogenizer (product name: UIP500HD, manufactured by: Hielscher) to obtain a paste. Then, the secondary particle diameter (secondary aggregate diameter) of the solid electrolyte particles for the anode in the paste, was measured by a particle size gauge (manufactured by: Dai-Ichi Sokuhan Works Co.)

The following Table II-1 shows, for comparison, the specific capacity retention rates after the 5 cycles of Examples II-1 to II-3 and Comparative Examples II-1 to II-3, along with the properties of the solid electrolyte particles for the anode.

TABLE II-1

| | Solid electrolyte particles for anode | | | |
|---|---|---|---|---|
| | Particle form | Bulk density ($g/cm^3$) | Second particle diameter (μm) after pulverizing | Specific capacity retention rate (%) after 5 cycles |
| Example II-1 | Polygonal form | 0.45 | 31 | 108 |
| Example II-2 | Polygonal form | 0.40 | 31 | 108 |
| Example II-3 | Polygonal form | 0.48 | 31 | 108 |
| Comparative Example II-1 | Flat form | 0.22 | 30 | 100 |
| Comparative Example II-2 | Spherical form | 0.50 | 50 | 108 |
| Comparative Example II-3 | Flat form | 0.17 | 30 | 100 |

II-4. Consideration

As a result of comparing the specific capacity retention rates after the 5 cycles shown in Table II-1, Comparative Example II-2 is about 1.1 times higher than Comparative Example II-1. However, as a result of comparing the secondary particle diameters of the solid electrolyte particles for the anode after pulverizing, Comparative Example II-2 is about 1.7 times higher than Comparative Example II-1. It is thought that this is because, since the bulk density of the solid electrolyte for the anode in the spherical form used in Comparative Example II-2 is 0.50 $g/cm^3$ and too high, the secondary aggregates of the solid electrolyte for the anode get closer to a close-packed structure (i.e., a structure in which spheres of the same size are stacked to minimize empty space) and, as a result, it is more difficult to pulverize them than the case where the bulk density is low.

As a result of comparing the specific capacity retention rates after the 5 cycles shown in Table II-1, Comparative Example II-3 is not different from Comparative Example II-1. It is thought that this is because, since the bulk density of the solid electrolyte for the anode used in Comparative Example II-3 is 0.17 $g/cm^3$ and too low, the electroconductive material is unevenly distributed in the anode, and the electron conducting path is locally narrowed and results in a decrease in capacity retention rate.

Also, as a result of comparing the specific capacity retention rates after the 5 cycles shown in Table II-1, Examples II-1 to II-3 are about 1.1 times higher than Comparative Example II-1. This is because, while the bulk density of the solid electrolyte for the anode used in Comparative Example II-1 is 0.22 $g/cm^3$ and low, the bulk densities of the solid electrolytes for the anode used in Examples II-1 to II-3 are 0.40 $g/cm^3$ or more and 0.48 $g/cm^3$ or less.

Therefore, the following was proved: the battery containing the solid electrolyte for the anode which has a bulk density of 0.40 $g/cm^3$ or more and 0.48 $g/cm^3$ or less, can suppress a decrease in capacity and is excellent in cycle characteristics, compared to the battery containing the solid electrolyte for the anode which has a bulk density out of the numerical range; moreover, it can suppress secondary aggregation of the solid electrolyte particles for the anode after pulverizing, and it can prevent an increase in the finally obtained particle diameter.

REFERENCE SIGNS LIST

1. Solid electrolyte layer
2. Cathode
3. Anode
101. Cathode-solid electrolyte layer-anode assembly

The invention claimed is:

1. An all-solid-state lithium ion secondary battery,
   wherein an anode comprises an anode active material, an electroconductive material and a solid electrolyte;
   wherein the anode active material comprises at least one active material selected from the group consisting of a metal that is able to form an alloy with Li, an oxide of the metal, and an alloy of the metal and Li;
   wherein the solid electrolyte is a LiX—$Li_2S$—$P_2S_5$-based solid electrolyte, where X is at least one halogen selected from the group consisting of F, Cl, Br and I; and
   wherein a bulk density of the solid electrolyte is 0.40 $g/cm^3$ or more and 0.48 $g/cm^3$ or less.

2. The all-solid-state lithium ion secondary battery according to claim 1, wherein the anode active material comprises at least one active material selected from the group consisting of elemental silicon and an alloy of Si and Li.

3. The all-solid-state lithium ion secondary battery according to claim 1, wherein the electroconductive material is at least one carbonaceous material selected from the group consisting of carbon black, carbon nanotube and carbon nanofiber.

* * * * *